United States Patent Office 3,337,561
Patented Aug. 22, 1967

3,337,561
PROCESS FOR OBTAINING ALKALOIDS
Johannes Mueller, Arlesheim, Switzerland, assignor to Ciba Corporation, New York, N.Y., a corporation of Delaware
No Drawing. Filed Apr. 1, 1964, Ser. No. 356,672
Claims priority, application Switzerland, Apr. 19, 1963, 4,924/63; Mar. 5, 1964, 2,846/64
3 Claims. (Cl. 260—294.3)

The present invention provides a new process for the manufacture of the Rauwolfia alkaloids tetrahydroalstonine and/or ajmalicine or mixtures thereof and of their salts.

It is known that ajmalicine possesses valuable adrenolytic properties and can be used as medicament. Ajmalicine corresponds to the formula

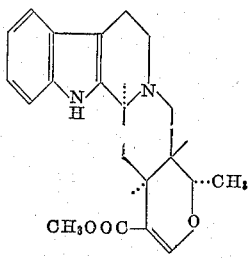

The present invention is based on the observation that the tetrahydro-alstonine of the formula

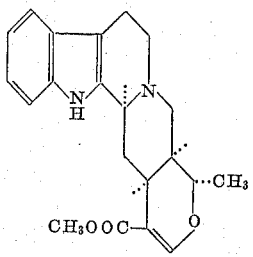

which is stereoisomeric to ajmalicine in position 20, surprisingly likewise displays valuable adrenolytic properties and may be used as a relevant medicament.

In the past these two alkaloids were obtained by hydrogenating the corresponding anhydronium bases prepared from extracts of plant material of Rauwolfia species, that is to say serpentine and alstonine respectively. The isolation of these anhydronium bases is, however, difficult and involves considerable losses. The process of the present invention, on the other hand, is simple and gives a very good yield of the desired final products.

According to the present process plant material of Rauwolfia species, or extracts thereof containing the Rauwolfia alkaloids belonging to the group of the anhydronium bases, are distributed within a substantially neutral pH-range between water and an organic solvent that is at most partially water-miscible, the content of the aqueous phase is then hydrogenated with a suitable hydrogenating agent and from the hydrogenation mixture tetrahydro-alstonine and/or ajmalicine or mixture or salts thereof are isolated.

As starting materials there are used, for example, plant materials such as root or bark material, of *Rauwolfia tetraphylla* (L.), *Rauwolfia ligustrina* Roem. et Schult, or above all *Rauwolfia serpentina* (L.) Benth. or *Rauwolfia vomitoria* Afz. In this way *Rauwolfia vomitoria* yields primarily tetrahydro-alstonine, whereas from *Rauwolfia serpentina* and *Rauwolfia ligustrina* Roem. and Schult ajmalicine is preferably obtained. The plant material may first be freed from secondary and tertiary alkaloid bases by extraction with an organic solvent that is at most partially water-miscible. Such solvents are, for example, halogenated aliphatic hydrocarbons, such as chloroform, ethylene chloride, methylene chloride or trichloroethylene; also ethyl acetate, or aromatic hydrocarbons, such as benzene or toluene. Furthermore, the plant material may be freed from its fat content, for example by extraction with petroleum ether.

Extracts suitable as starting materials are, for example, such as have been prepared from the plant material—if desired after preliminary defatting and/or extraction of the secondary and tertiary alkaloid bases as mentioned above—by treatment with an alcohol, such as ethanol or methanol; or such as have been obtained by extracting the plant material or an alcoholic extract thereof with an aqueous acid, such as acetic acid or phosphoric acid or an acid salt thereof, and, if desired, after removal of the tertiary bases by extraction with one of the solvents referred to above, subsequent neutralisation of the acidic solution.

The distribution between water and the partially water-miscible organic solvent is performed in the usual manner. Solvents that are specially suitable for this purpose are those mentioned above. When the starting material contains a substantial share of ajmalicine, chloroform is the solvent of choice.

The water extracts are advantageously hydrogenated with alkali metal borohydrides, such as sodium or potassium borohydride, or with other borohydrides which can be used in the presence of water, advantageously in water or preferably in an aqueous organic solvent, such as an aqueous alcohol, for example aqueous methanol or ethanol.

The isolation of tetrahydro-alstonine and/or ajmalicine or of their mixtures from the hydrogenation batch is performed in a known manner. Advantageously, the desired alkaloids are isolated from the hydrogenation mixture— if desired after removal of the alcohol, for example by evaporation—with the aid of an organic solvent that is at most restrictedly water-miscible, if desired after acidification. From the extract obtained in this manner the desired alkaloid(s) can be obtained by the usual measures, such as crystallisation, if desired after purification and/or salt formation.

The purification is preferably performed by way of chromatography in one of its diverse forms, such as adsorption or partition chromatography or paper-chromatography. Inter alia, it is possible to perform the chromatography on, for example, Super Hyflo or alumina (neutral, activity II or III).

When the product of the present process is a mixture of tetrahydro-alstonine and ajmalicine, it can be resolved by fractional crystallisation or by one of the separation methods based on selective adsorption, for example by one of the afore-mentioned chromatographic methods. On alumina, for example, tetrahydro-alstonine travels slightly faster on elution with mixtures of benzene+hexane than does ajmalicine, which fact enables these two alkaloids to be separated from each other.

Alternatively, the alkaloids can be purified by conversion into salts and liberation of the bases from the isolated salts. The isolation and purification steps can be combined and/or repeated, as is usual.

Depending on the reaction conditions used the final products or intermediates are obtained in the free form or in the form of their salts. The salts of the final products can be converted in the known manner into the free bases. When the bases are reacted with organic or inorganic acids capable of forming therapeutically useful salts, they yield the corresponding salts. As such acids there may be mentioned, for example, hydrohalic acids, sulphuric acids, phosphoric acids, nitric or perchloric acid; aliphatic, alicyclic, aromatic or heterocyclic carboxylic or sulphonic acids, such as formic, acetic, propionic, oxalic, succinic, glycollic, lactic, malic, tartaric, citric, ascorbic, maleic, hydroxymaleic or pyruvic acid; phenylacetic, benzoic, para-aminobenzoic, anthranilic, para-hydroxybenzoic, salicyclic or para-aminosalicyclic acid, methanesulphonic, ethanesulphonic, hydroxyethanesulphonic or ethylenesulphonic acid; halogenobenzenesulphonic, toluenesulphonic, naphthalenesulphonic acids or sulphonic acid; methionine, tryptophan, lysine or arginine.

The salts of the new compounds may also be used for purifying the resulting bases by converting the latter into salts, isolating the salts and once more liberating the bases from the salts.

The alkaloids obtained by the present process in an advantageous manner, and their salts—more especially tetrahydro-alstonine which has hitherto not been proposed for such purposes—may be used as medicaments, for example in the form of pharmaceutical preparations containing them or their salts in conjunction or admixture with an organic or inorganic, solid or liquid excipient suitable for enteral or parenteral administration. Suitable excipients are substances that do not react with the new compounds, for example water, gelatine, lactose, starches, stearyl alcohol, magnesium stearate, talcum, vegetable oils, benzyl alcohols, gums, propylene glycol, polyalkylene glycol, white petroleum jelly, cholesterol or other known medicinal excipients. The pharmaceutical preparations may be, for example, tablets, dragees or capsules, or in liquid form solutions, suspensions or emulsions. They may be sterilised and/or may contain assistants such as preserving, stabilizing, wetting or emulsifying agents, solution promoters, salts for regulating the osmotic pressure or buffers. They may also contain further therapeutically valuable substances. The pharmaceutical preparations are formulated in the usual way. They contain, for example, 0.5 to 10 mg. of active principal per dosage unit.

The amount of excipient may vary within wide limits (for example between 0.01 and 10%) and depends predominantly on the route of administration.

The new compounds may also be used in veterinary medicine, for example in one of the forms mentioned above or in the form of animal fodder or additives to animal fodders, with the use, for example, of the conventional extenders and diluents or animal fodders respectively.

The following examples illustrate the invention.

*Example 1*

2.0 kg. of ground bark of *Rauwolfia vomitoria* Afz. are moistened with 2 liters of water and extracted under reflux for 10 hours with 10 liters of trichloroethylene.

The bark material is then freed from trichloroethylene and extracted with 10 liters of methanol for 10 hours under reflux; when this extract is freed from the solvent by evaporation under vacuum, it yields 269 g. of dry residue in the form of a dark-brown, resinous substance.

A solution of 121 g. of this residue in 242 ml. of methanol is mixed with 121 ml. of water and slightly heated. This solution is then dropped into a vigorously stirred mixture of 4 liters of chloroform and 4 liters of water, and the whole is stirred on for ½ hour. When the two layers have separated (partial emulsion), the chloroform phase is decanted. The aqueous phase is extracted twice more with chloroform, and the three chloroform extracts are successively washed with 1 liter of water. The aqueous phases are filtered through a 1-cm-layer of Hyflo and then concentrated under vacuum to a volume of 2 liters. The concentrate is mixed with 5 liters of methanol and hydrogenated at room temperature with vigorous stirring by adding portionwise a total of 20 g. of sodium borohydride, and then stirred on for 1½ hours. The mixture is then neutralized with 25 ml. of glacial acetic acid and concentrated under vacuum to 2 liters, acidified with 200 ml. of glacial acetic acid and extracted three times with ethylene chloride (total 4 liters). The extract solution is neutralized with sodium carbonate solution, washed with water, dried with calcined sodium sulfate and evaporated to dryness under vacuum. Yield: 20.2 g. of a light-brown residue which contains over 50% of tetrahydro-alstonine which can be crystallised by being heated in ethanol. Alternatively, the residue may be dissolved in a 3:1-mixture of benzene and hexane and filtered through a column of 600 g. of alumina (neutral, activity II or III according to Brockmann), the identical solvent mixture being used to elute colorless, extremely pure tetrahydroalstonine in a yield of 12 g.

*Rauwolfia serpentina* Benth. yields on identical treatment ajmalicine.

4.0 g. of tetrahydro-alstonine are suspended in 20 ml. of methanol, then 3.4 ml. of 4.4 N-methanolic hydrochloric acid are slowly stirred in (pH 3 to 4), and the solution is concentrated to a small volume, whereupon the hydrochloride crystallises out; it is filtered off, and washed with ether+methanol. The tetrahydro-alstonine hydrochloride obtained in this manner melts at 272° C. (up to 278° C.).

*Example 2*

15 grams of dry methanol extract from root material of *Rauwolfia ligustrina* R. and S. is dissolved by adding 30 ml. of methanol and 30 ml. of water and poured in a thin jet into a vigorously stirred mixture of 500 ml. of chloroform and 500 ml. of water. The reaction mixture is stirred for another half an hour and is then filtered through a thin Hyflo (registered trademark) layer. After the clarifying agent (Hyflo) has been rinsed with a few ml. of water and chloroform, the two phases are separated in the combined filtrate. The aqueous phase is extracted twice with chloroform (400, 300 ml.). The resulting three chloroform phases are washed successively twice with 150 ml. of water each time. The combined chloroform phases are then dried with calcined sodium sulphate and evaporated to dryness under reduced pressure. They contain practically all the secondary and tertiary bases.

The combined aqueous phases, which contain for the most part quaternary bases, are concentrated under reduced pressure to a volume of 200 ml. and then treated with 400 ml. of methanol. 3.0 grams of sodium borohydride are then added in small portions in the course of 15 minutes at 20° C. with vigorous stirring. Stirring is continued for 1½ hours, and the solution is then adjusted to a pH value of 6 by the addition of 5 ml. of glacial acetic acid. The reaction mixture is then concentrated under reduced pressure to a volume of about 200 ml. The aqueous solution is acidified with glacial acetic acid to a pH value of about 3–4 and extracted five times with 200 ml. of ethylene chloride each time. The ethylene chloride extracts are washed by being extracted with 20 ml. of acetic acid of 10% strength, neutralised with N-sodium bicarbonate solution, dried with calcined sodium sulphate, filtered and evaporated to dryness under reduced pressure to yield 370 mg. of residue which crystallises very easily.

The crude crystallisate can be purified by re-crystallisation from ethanol or by short chromatography on neutral aluminum oxide (activity II–III according to Brockmann). For the latter purpose, the substance is dissolved in a mixture consisting of 3 parts by volume of benzene and 1 part by volume of hexane and filtered through a column of 15 grams of aluminum oxide. 130 ml. of the mixture of solvents suffice to elute the desired base which precipitates in the form of snow-white crystals after evaporation of the solvent. Pure ajmalicine melting at 261.5–262° C. is obtained which is identical with authentic ajmalicine with regard to the mixed melting point, paper and thin-layer chromatography. In the mother liquor of crystallisation a small quantity of tetrahydro-alstonine in addition to further ajmalicine is determined by thin-layer chromatography.

*Example 3*

51 grams of an extract from *Rauwolfia vomitoria* Afz., obtained as described in Example 1 by extraction with trichlorethylene and extracting the undissolved portion with methanol, and freed from ajmaline and the other weak bases as described in Example 1 by distribution between water and methylene chloride, are dissolved in 800 ml. of water and 2000 ml. of methanol while being stirred vigorously. 9.0 grams of sodium borohydride are added in portions in the course of 20 minutes at room temperature with stirring. Stirring is continued for 1½ hours and the mixture is then adjusted to a pH value of 6 with 11.5 ml. of glacial acetic acid and concentrated to a volume of about 500 ml. under reduced pressure. The solution freed in this manner from methanol is acidified with 80 ml. of glacial acetic acid and extracted with 500 ml. of ethylene chloride four times. The extracts are washed in the manner described in Example 2, dried and evaporated to dryness under reduced pressure. The residue is filtered as described in Example 1 through aluminum oxide to yield pure tetrahydro-alstonine.

*Example 4*

10.2 grams of the extract used in Example 3 are dissolved in 100 ml. of water and 250 ml. of dioxan and hydrogenated with 1.8 grams of sodium borohydride and worked up in the manner described in Example 3. Filtration through aluminum oxide and extraction of the ethylene chloride solution from a mixture of benzene and hexane (3:1) yields pure tetrahydro-alstonine.

What is claimed is:

1. A process for obtaining a member selected from the group consisting of the Rauwolfia alkaloids tetrahydro-alstonine, ajmalicine, mixtures and salts thereof, wherein plant material of a Rauwolfia species selected from the group consisting of *Rauwolfia tetraphylla* (L.), *Rauwolfia ligustrina* Roem. et Schult, *Rauwolfia serpentina* (L.) and *Rauwolfia vomitoria* Afz. or an extract thereof containing the Rauwolfia alkaloids belonging to the group of the anhydronium bases, is distributed within a substantially neutral pH range between water and an inert organic solvent that is at most partially water-miscible, the content of the aqueous phase is hydrogenated with a borohydride hydrogenating agent, and from the hydrogenation mixture a member selected from the group consisting of tetrahydro-alstonine, ajmalicine, mixtures and salts thereof is isolated.

2. Process as claimed in claim 1 wherein a resulting mixture of tetrahydro-alstonine and ajmalicine is separated by a procedure selected from the group consisting of fractional crystallization and selective absorption.

3. Process as claimed in claim 1 wherein a member selected from the group consisting of root and bark material of a member selected from the group consisting of *Rauwolfia vomitoria* Afz., *Rauwolfia serpentina* Benth. and *Rauwolfia ligustrina* R. and S. and an extract thereof is used as starting material.

References Cited

FOREIGN PATENTS 966,024   7/1957   Germany.

OTHER REFERENCES

Siddiqui et al., J. Ind. Chem. Soc., Vol. 8 (1931), page 668.

Willaman et al., Economic Botany, Vol. 9 (1955), page 142.

WALTER A. MODANCE, *Primary Examiner.*

JOHN D. RANDOLPH, *Examiner.*

J. A. PATTEN, *Assistant Examiner.*